US 9,053,576 B2

(12) United States Patent
Baumgartner et al.

(10) Patent No.: US 9,053,576 B2
(45) Date of Patent: Jun. 9, 2015

(54) IDENTIFYING REROUTABLE DATA COLUMNS IN AN ETL PROCESS

(75) Inventors: Helmut Baumgartner, Nurtingen (DE); Christian Gaege, Tuebingen (DE); Steffen Kabisch, Stuttgart (DE); Stefanie Scherzinger, Munich (DE); Sergej Schuetz, Boblingen (DE)

(73) Assignee: International Business Machines Corporation, Armonk, NY (US)

( * ) Notice: Subject to any disclaimer, the term of this patent is extended or adjusted under 35 U.S.C. 154(b) by 712 days.

(21) Appl. No.: 13/217,714

(22) Filed: Aug. 25, 2011

(65) Prior Publication Data
US 2012/0154405 A1 Jun. 21, 2012

(30) Foreign Application Priority Data

Dec. 21, 2010 (EP) .................................... 10196089

(51) Int. Cl.
G06F 17/30 (2006.01)
G06T 11/20 (2006.01)
(52) U.S. Cl.
CPC ........ G06T 11/206 (2013.01); G06F 17/30563 (2013.01); G06F 17/30404 (2013.01); G06F 17/30421 (2013.01)
(58) Field of Classification Search
CPC .................... G06F 17/30362; G06F 17/30359; G06F 17/30442; G06F 17/30566; G06F 17/30592; G06F 17/30563; G06F 17/30404; G06F 17/30421
USPC .......... 707/602, 756; 717/106, 151, 195, 153, 717/154
See application file for complete search history.

(56) References Cited

U.S. PATENT DOCUMENTS

| | | | |
|---|---|---|---|
| 7,730,057 B2 * | 6/2010 | Bell et al. ...................... 707/720 |
| 7,747,563 B2 | 6/2010 | Gehring |
| 7,805,341 B2 * | 9/2010 | Stromquist et al. ............. 705/30 |
| 7,953,891 B2 * | 5/2011 | Blaszczak et al. ............ 709/246 |
| 8,099,725 B2 * | 1/2012 | Jin et al. ......................... 717/151 |
| 8,122,033 B2 * | 2/2012 | Le et al. ........................ 707/749 |
| 8,200,614 B2 * | 6/2012 | Syed et al. .................... 707/602 |
| 8,639,652 B2 * | 1/2014 | Xu et al. ........................ 707/602 |
| 2006/0277155 A1 * | 12/2006 | Bell et al. .......................... 707/2 |
| 2007/0074155 A1 * | 3/2007 | Ama et al. .................... 717/106 |

(Continued)

OTHER PUBLICATIONS

"Improving the Performance of the Data Flow", msdn.microsoft.com, Sep. 9, 2010, pp. 1-11.
"Building the Foundation for a Scalable ETL", information-management.com, Sep. 9, 2010, pp. 1-3.

*Primary Examiner* — Jean M Corrielus
(74) *Attorney, Agent, or Firm* — Susan Murray; Edell, Shapiro & Finnan, LLC

(57) ABSTRACT

Reroutable data columns are identified in an ETL process by receiving an ETL process definition describing a set of processing stages and how each processing stage output data column is a result of a function that operates on a set of input data columns, representing the ETL process definition as a directed graph with nodes representing processing stages and links representing data flow between processing stages, traversing at least part of the directed graph and identifying a set of subsequent nodes of the directed graph where at least one data column is involved only as input data in identity functions, the at least one data column being reroutable between outmost nodes of the set of subsequent nodes, and in connection with traversing the at least part of the directed graph, maintaining information about reroutable data columns and the respective outmost nodes.

25 Claims, 10 Drawing Sheets

(56) References Cited

U.S. PATENT DOCUMENTS

| | | | |
|---|---|---|---|
| 2007/0136324 A1* | 6/2007 | Xu et al. | 707/100 |
| 2008/0092112 A1* | 4/2008 | Jin et al. | 717/106 |
| 2008/0222634 A1* | 9/2008 | Rustagi | 718/100 |
| 2009/0177621 A1* | 7/2009 | Le et al. | 707/2 |
| 2010/0205351 A1 | 8/2010 | Wiener et al. | |
| 2011/0060719 A1* | 3/2011 | Kapoor | 707/602 |
| 2011/0295865 A1* | 12/2011 | Carroll et al. | 707/756 |

\* cited by examiner

IDENTIFYING REROUTABLE DATA COLUMNS IN AN ETL PROCESS

BACKGROUND

The present invention relates to a method for identifying reroutable data columns in an ETL process and a method for processing data columns in an ETL process. The present invention further relates to a computer program product and a system for executing the above methods.

ETL processes refer to processes for Extraction, Transformation and Loading (ETL) data. Such ETL processes are commonly used in data integration applications to integrate data from at least two different sources. Such data integration applications are e.g. used, to integrate data of different companies in case of mergers and acquisitions, or when data from different departments inside one company has to be integrated.

ETL processes comprise a set of stages, which operate on data. The stages are connected via links, so that the entire ETL process forms a data flow graph from a source stage, where the data is loaded, to a target stage, where the data is stored. In between, the data can be processed, combined, passed through or transformed in any way. The data itself is represented in records, which contain a set of different columns as individual data elements. Individual steps of the processing of the data from the source to the target can be performed in a parallel implementation, e.g. on multiple processors of a single hardware platform or on multiple hardware platforms, which are connected by a network connection. Such distributed execution can be implemented nowadays by design tools for ETL processes, e.g. IBM® InfoSphere® DataStage®, which can automatically implement parallel processing without a user-provided configuration. (IBM, InfoSphere and DataStage are trademarks of International Business Machines Corporation, registered in many jurisdictions worldwide.)

In ETL processes, storage of sources and targets as well as the processing of data can be distributed. A source database can be distributed over different network locations, the processing of the source data being separated in a set of stages, where each stage may be performed individually on a single hardware system, and a target database may be distributed over different physical systems, the systems being different from the systems of the source database. A single stage of the processing can also be implemented in parallel to be executed on multiple cores or processors of a single computer or multiple computers.

ETL processes generally are applied to very large amounts of data and therefore consume large amounts of resources. This refers to processing power as well as a memory or storage capacity, and/or, in the case of distributed implementations of the ETL process, network resources. Data unnecessarily transported from one stage to another, when the data is not used in the particular stage is referred to as bulk data having respective bulk columns.

SUMMARY

Embodiments of the invention optimize ETL processes and provide a method for reducing the amount of data moved during the execution of an ETL process.

An embodiment provides a method for identifying reroutable data columns in an ETL process, comprising receiving an ETL process definition describing a set of processing stages and how each processing stage output data column is a result of a function that operates on a set of input data columns, representing the ETL process definition as a directed graph with nodes representing processing stages and links representing data flow between processing stages, traversing at least part of the directed graph and identifying a set of subsequent nodes of the directed graph wherein at least one data column is involved only as input data in identity functions, such a data column being reroutable between outmost nodes of the set of subsequent nodes, and in connection with traversing the part of the directed graph, maintaining information about reroutable data columns and the respective outmost nodes.

A further embodiment provides a method for processing data columns in an ETL process having an ETL process definition describing a set of processing stages and how each processing stage output data column is a result of a function that operates on a subset of input data columns, comprising the steps of identifying reroutable data columns in the ETL process according to the above method, and rerouting the input data columns identified to be reroutable from the one outmost node to the other outmost node along the directed graph.

A further embodiment also provides a computer program product comprising a computer-readable medium including a computer-readable program code, wherein the computer-readable program code is adapted to execute one of the above methods.

Yet a further embodiment of the present invention provides a system for executing one of the above methods comprising a storage device for storing a computer usable program code and a processor for executing the computer usable program code to execute the method according to one of the above method claims.

BRIEF DESCRIPTION OF THE SEVERAL VIEWS OF THE DRAWINGS

Example embodiments of the invention are illustrated in the accompanied figures. These embodiments are not intended to limit the content and scope of the appended claims.

DETAILED DESCRIPTION

Figure 1:
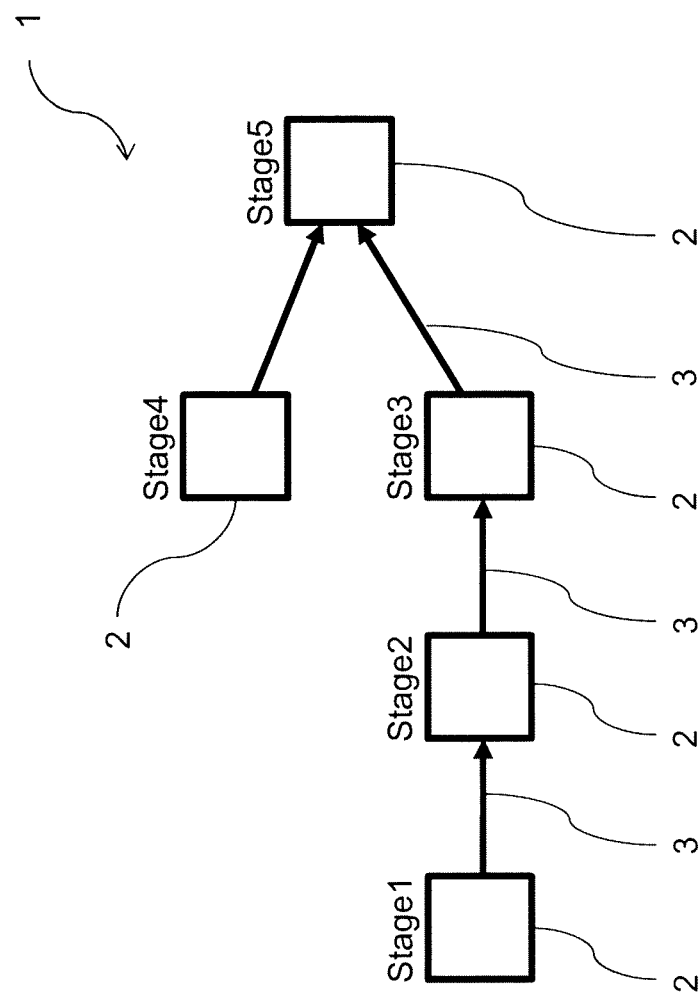
FIG. 1 shows a flow chart of an ETL process comprising five stages.

An embodiment of the present invention automatically detects bulk data by evaluating the processing of data columns in each stage of the ETL process to identify for each unused data column sets of subsequent stages in which the data column is not processed. Processing refers to modifications to the data column itself or the creation of a data column under use of this data column.

Accordingly, when data is not being processed in a set of subsequent stages, the respective data columns can immediately be passed from the input of a first outmost stage according to the directed graph to the last outmost stage, thereby reducing the overall processing resource consumption in respect to unused bulk columns and increasing performance. The information about the data flow between different stages can further be used for designing a system for performing the method. This can be applied by process optimization, whereby processes can be reorganized to reroute bulk data, e.g. by adding split and join stages, so that it is only processed when required. The detailed process for determining where rerouting should be applied requires detailed information on the ETL processing environment (such as hardware configuration, software stack and network topology) and an algorithm for estimating the final performance gain based on heuristics and/or benchmark data.

The identified bulk data can also be used for tool optimization of ETL tools like IBM InfoSphere DataStage. The tools can use the information to internally reroute bulk data in ETL processes. The identification of bulk columns is done before the ETL process is started. During the execution of the ETL process, the ETL tool engine only passes data columns to the appropriate stages when they are actually required for processing. This can happen internally without the need to alter the process design. The user may not be informed of the processing changes. The advantage of this solution is that no additional stages are added to the process design. The processing of bulk data can be performed by optimized routing mechanisms instead of explicit, additional stages, thus consuming less system resources.

The information on identified bulk data can be further used to visually enrich ETL process descriptions, e.g. as a graph. For example, links passing mostly bulk data can be drawn in a specific manner and links that pass no bulk data can be drawn in a different manner. Based on the visual information, process designers can identify flaws in the ETL processes. Accordingly, processes can be designed under consideration of real data flows, which generally leads to more compact processes, which are more economic.

An embodiment may attempt to identify an exact processing of each data column within a stage. In general, all processing steps except while-loops can be successfully investigated for identifying bulk data. While-loops can depend on the contents of the data column, so that the processing can only be determined under consideration of the processed data. Whenever a data column is passed through a first stage to a second stage unmodified, it will be identified as a bulk column. The same happens, when the data column is passed through a second stage without being modified. Accordingly, an embodiment may identify, that the data column is not processed in both the first stage and the second stage, so that the bulk data can be bypassed immediately from the input of the first stage to the output of the second stage.

A modified embodiment of the invention comprises normalizing the processing stages by separating processing stages into respective sets of source stages, target stages and transit stages, wherein source stages read data columns from an external source, target stages send data columns to an external target, and transit stages read and send data columns within the ETL process. Transit stages can further perform transformations based on at least one input data column. Normalizing refers to breaking down all stages of the ETL process into source stages, transit stages and target stages, which facilitate an identification of the flow of data columns within the ETL process. Therefore, mixed type stages like e.g. transit-target stages, which write their output to a link as well as to an external target, are broken down into a transit stage, linked to a separate target stage, and having another link connected to the next subsequent stage. Also implemented "for" loops can be broken down to the three kinds of stages.

In a modified embodiment of the present invention, receiving the ETL process definition comprises performing an analysis on how the output data column of at least one processing stage is a result of a function that operates on at least one input data column. The analysis determines the processing of input data column inside a stage, so that for each input data column can be evaluated, if a function other than identity function is applied to each input data column. This information can be obtained e.g. from a design tool for designing the ETL process. Also reverse engineering of the implementation of an ETL stage can be applied.

According to a preferred embodiment of the present invention, receiving the ETL process definition comprises receiving meta-information regarding how at least one processing stage output data column is a result of a function that operates on a subset of input data columns of this at least one processing stage. Especially in case of stages having a higher complexity, the meta-information can help to give a detailed understanding of the behavior of that stage, so that evaluation of input data columns, which are not processed within that stage, can easily be performed.

In a modified embodiment of the present invention, traversing at least part of a directed graph comprises identifying a root of the graph and traversing at least part of the directed graph beginning at the root. When taking only the root(s) of the graph as starting point(s), the method can be implemented in a simple way. Beginning with the root, it is evaluated for all input data columns in which stage they are being processed for the first time, in case they are being processed. This stage defines the second outmost node. In case the first and second outmost nodes are identical for a data column, no bypassing occurs for this data column. This simple implementation does not check for bypassing that could occur starting at an intermediate processing stage and stopping at another intermediate processing stage or a target stage.

A preferred embodiment of the present invention comprises adding identifiers of all input data columns of a stage into a list with respect to a first of the outmost nodes, removing them if the respective input data column has been processed in the first of the outmost nodes, and adding an identifier of the second of the outmost node to the respective entry in the list. Once the list has been processed entirely, it gives an overview for reroutable data columns, so that the rerouting can be easily applied. In case of branches connecting one node to multiple subsequent nodes, the respective entry of the list has to be copied accordingly for processing of all branches.

In a modified embodiment of the present invention, traversing at least part of the directed graph and identifying a set of subsequent nodes of the directed graph where at least one data column is involved only as input data in identity functions comprises adding to each identifier an indication of a link, where the data column is further transmitted or from where it is received. By adding the indication of the link to the entries of the list, a unique identification for the data flow inside the direct graph is given. This allows especially covering existing branches in the graph formed by a connection from one stage to at least two subsequent stages.

In a preferred embodiment of the present invention, adding an identifier of the second of the outmost nodes to the respective entry in the list comprises, starting with the first of the outmost nodes as current node, incrementally updating the second of the outmost nodes with a reference to a subsequent node, if the data column is not processed in the current node, and continuing to at least one subsequent node as current node, until the data column is being processed in the current node. Accordingly, when traversing the directed graph, the respective entry regarding the second outmost node for the data column is updated in the list, as long as the input data column is not being processed.

A modified embodiment of the present invention comprises adding status information indicating a processing status of a data column to the list. The status information can be used to mark data columns, for which a processing has already been detected in a stage. When a data column is processed more than once in a stage, an evaluation of the stage with respect to the data column can be stopped as soon as a first processing has been detected. Also, all data columns can be marked at the beginning of the evaluation as unprocessed, which allows making the analysis based on the behavior of the stage instead of starting from each data column. If fewer data columns are processed in a stage, computation time can be reduced.

According to a preferred embodiment of the invention, each node has a set of multiple input data columns and rerouting the input data columns identified to be reroutable from the one outmost node to the other outmost node along the directed graph comprises separating the set of multiple input data columns into a set of processing data columns, which are provided to the respective stage, and a set of bulk data columns, which are involved only as input data in identity functions and bypass the respective stage, each comprising meta-information for joining the set of bulk data columns and a set of processed data columns, the latter based on the set of processing data columns. The meta-information allows the separation of the set of input data columns into the processing data columns and the bulk data columns, so that the set of processed data columns can be adjoined to the set of bulk data columns. If the stage is not the second of the outmost stages for the respective data column, the data column is joined later, when its second outmost stage has been reached.

In a modified embodiment of the present invention, separating the set of multiple input data columns into a set of processing data columns, which are provided to the respective stage, and a set of bulk data columns, which are involved only as input data in identity functions and bypass the respective stage, comprises providing the set of processing data columns in a structure identical to a structure of the set of multiple input data columns. Accordingly, since the bulk data columns will not be accessed during the processing in this stage, the structure does not have to be modified. It is only required that at the second of the outmost nodes the required input data column(s) can be combined. In case the input data columns are provided as a record, e.g. the record can be separated by transferring bulk data columns into a bypassing record and eliminating them in the original record.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, a graph of an ETL process 1 is shown by way of example. The ETL process 1 comprises five stages 2, also called nodes, which are connected by links 3. The links 3 indicate by the arrow the direction of data transmission from one stage to the other. Two of the stages 2, denoted as stage1 and stage4, define starting points or roots of the graph of the ETL process 1.

Figure 2:
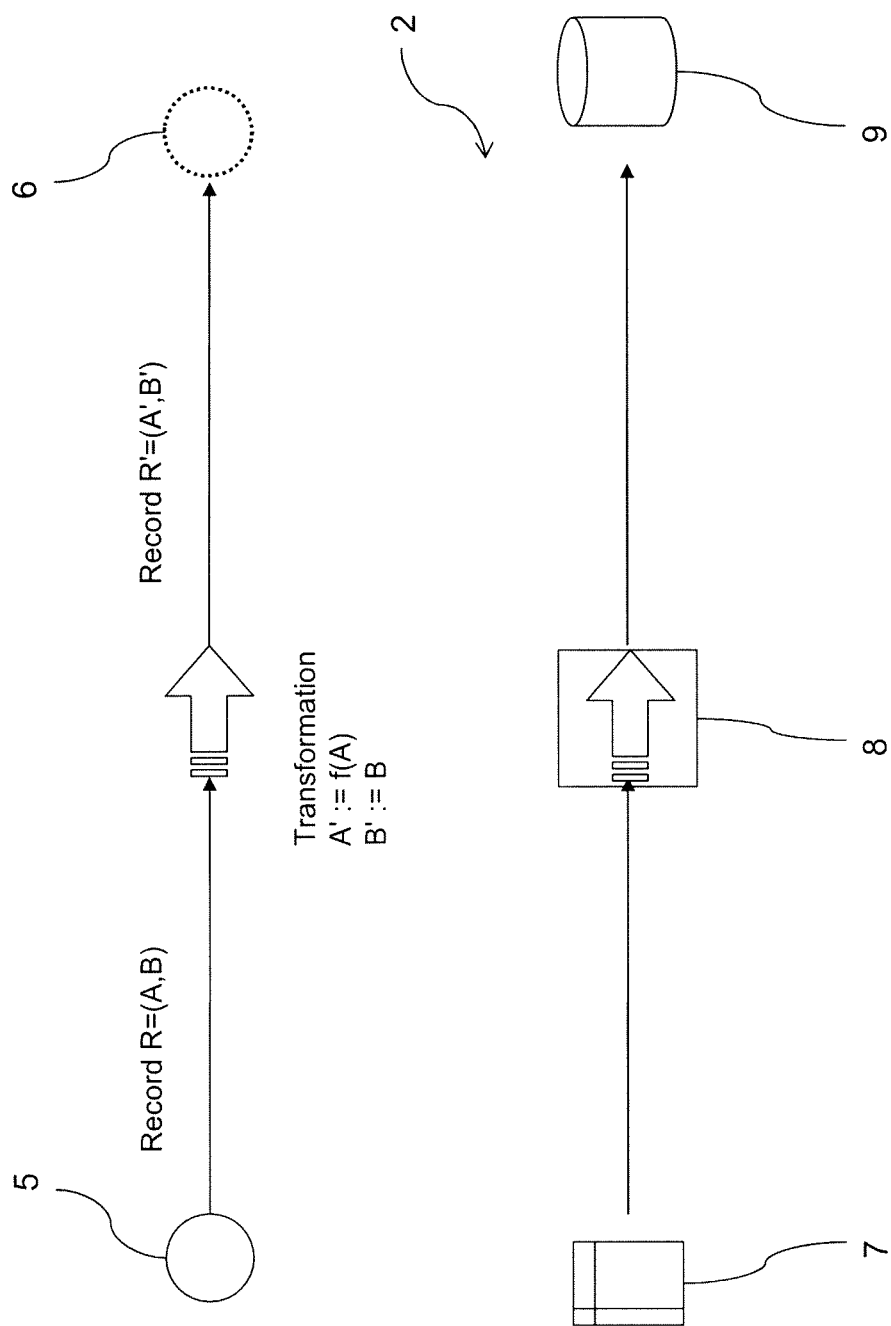
FIG. 2 shows a basic processing of data at a stage of an ETL process as a schematic diagram.

A general behavior of a stage 2 can be seen in FIG. 2 on the top. An input record R comprises two input data columns A, B, which are provided by a data source 5. The input record R is by way of example in this stage 2 transformed to an output record R' comprising output data columns A', B. The output record R' is passed to a data target 6. The records R, R' can be provided as streams containing the data columns.

The transformation implemented in this stage 2 comprises two functions, also referred to as derivations. One is a function depending only on the input data column A; it calculates the output data column A'. The other function is an identify function that is applied to input data column B to produce output data column B' Accordingly, input data column B is passed to output data column B' without modification. An implementation of this stage is shown in the lower part of FIG. 2, where data from a file 7 as source 5 is read, passed to a transformer 8 for doing the transformation, and the transformed data is stored in a database 9 as target 6. Depending on a desired processing of the stage 2, complex functions also can be implemented, including the processing of multiple input data columns for calculating a single output data column.

Figure 3:
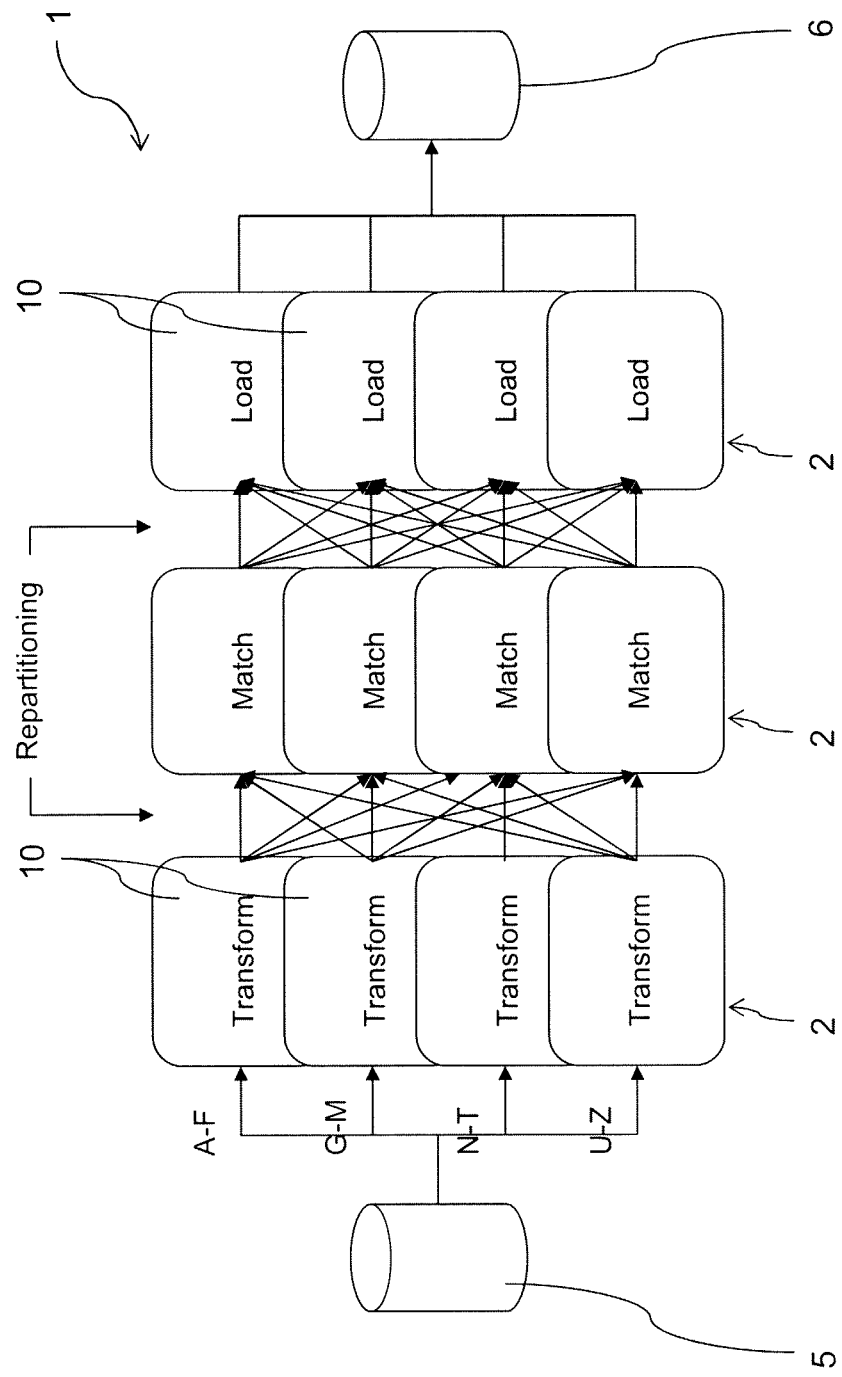
FIG. 3 shows a complex ETL process distributed over different processors as a schematic diagram.

FIG. 3 shows an implementation of a more complex ETL process 1. Also in this example, data is taken from a source 5 and processed inside the ETL process 1 by three sequentially arranged stages 2 to provide data to the target 6. It is to be noted that any kind of data processing can be realized within any stage 2. In this example the stages 2 subsequently transform, match and load data. The internal structure of the ETL process 1 of this example is complex and highly parallel, where the stages 2 are separated to be processed individually by different processes 10, e.g. by different processors on different computers. As indicated by the letters at the input of the parallel processes 10 of the first stage, different data is processed individually in each parallel process 10. Further, repartitioning takes place between all stages 2. Accordingly, the transformed data columns from the different processes 10 are provided to different processes 10 on different processors of the subsequent stage 2. The output of the processes 10 of the last stage is then recombined for storing it on the target 6.

Figure 4:
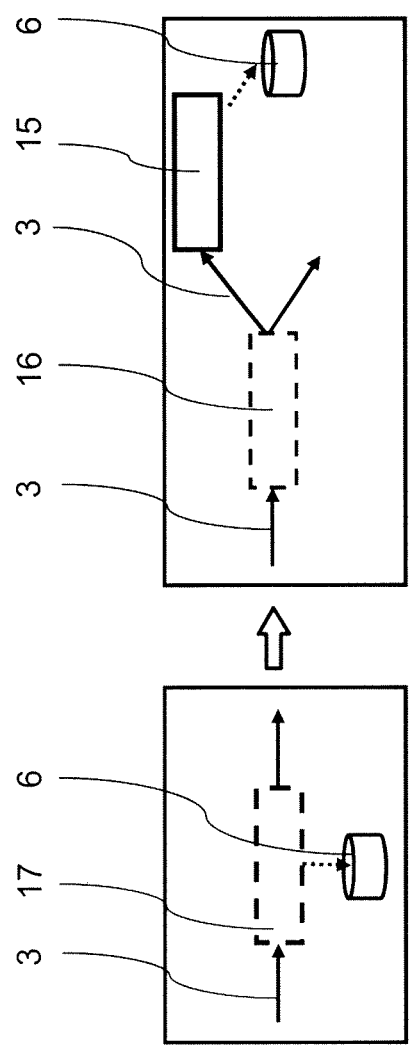
FIG. 4 shows a normalization of a stage as a schematic diagram.

When an ETL process definition describing a set of processing stages 2 is received, the ETL process 1 is first represented as a directed graph as shown with respect to FIG. 1 by way of example. To facilitate the automatic identification of reroutable data columns in the ETL process 1, the stages 2 of the ETL process 1 are normalized. This means, that all stages are separated into at least one of the group of source stages, which read data columns from an external source 5, target stages 15, which send received data columns to an external target 6, and transit stages 16, which read and send data columns within the ETL process 1. Normalization is shown by way of example according to FIG. 4, where a stage 2 is provided comprising a transit target stage 17, as shown on the left side of FIG. 4. This means that the shown stage 2 sends data columns to an external target 6 and reads and sends data columns within the ETL process 1. When normalization is performed, the stage 2 is separated into an individual transit stage 16 and a target stage 15, as shown on the right side of FIG. 4.

Before the analysis starts, a bulk candidate list is created. All input data columns of all stages 2, which read data from a source 5, further referred to as source stages 2, are added to the list. The list as shown below contains four columns, where the first column contains a mark for processing, the second column identifies the source data column of the bulk candidate, the third column identifies the target data column of the bulk candidate according to the processing, and an intermediate column is being used for intermediate marks.

| Mark | Bulk Source | Bulk Target | Intermediate |
|---|---|---|---|
| | Stage1.Link1.Column1 | Stage1.Link1.Column1 | |
| | Stage1.Link1.Column2 | Stage1.Link1.Column2 | |
| | Stage2.Link2.Column1 | Stage2.Link2.Column1 | |

A unique identifier is assigned to all data columns on all output links of all the source stages. The unique identifier contains the identification of the stage 2, an identification of the link 3, where the respective data column is being transmitted, and finally an identification of the respective data column itself. This implies that in case a data column is sent to two or more stages 2, an independent entry is created for each copy of the column. Initially, the unique identifier of each data column is assigned to both the column denoted "Bulk Source" and to the column denoted "Bulk Target".

The hereinafter described analysis is performed for each output link on each stage 2 in the directed graph. The traversal of the directed graph is done by an appropriate traversal algorithm like "depth-first" or "breadth-first".

Figure 5:
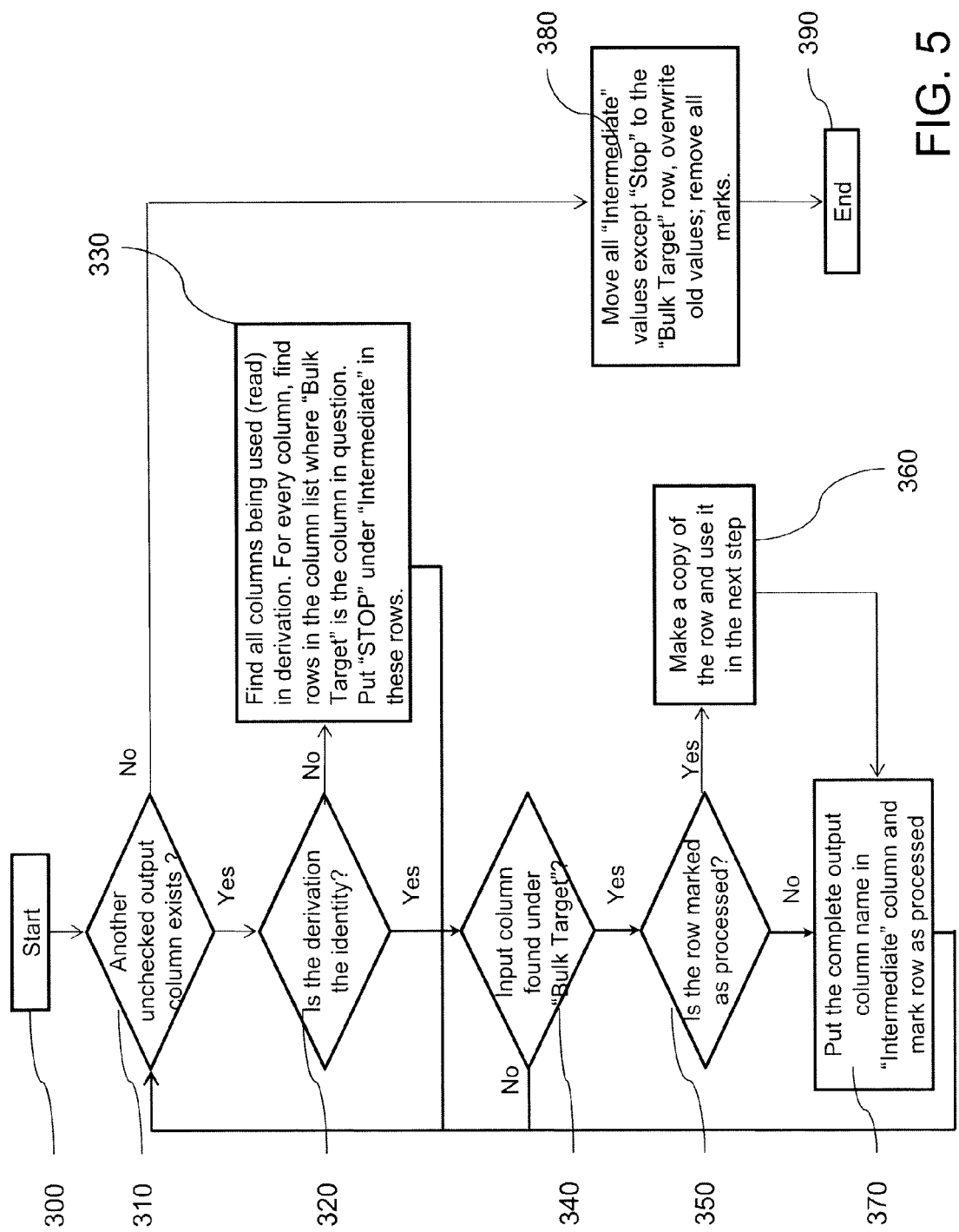
FIG. 5 shows a flow chart of the analysis of a transit stage.

With reference to FIG. 5, details for the analysis are described.

The analysis is started in step 300.

According to step 310, it is verified, if another unchecked output data column of the current stage exists. The algorithm for the analysis iterates over the output data columns of the current stage. If yes, the analysis continues with step 320, otherwise with step 380.

In step 320, it is verified if the derivation for generating the respective output data column is the identity. Identity indicates that the output data in the data column is identical to the data from one input data column. This includes that data column metadata such as type, length etc. is not modified. If the derivation is not the identity, involved input data columns cannot bypass the current stage. If the derivation is identity, the analysis continues with step 340, otherwise with step 330.

According to step 330, all input data columns involved in the generation of the output data column are identified. For each of the input data columns, including all occurrences of the input data column, the bulk candidate list is updated with a special "STOP" codeword in the "Intermediate" column. Previous values of the "Intermediate" column of this data column are overwritten. No additional changes are performed on this entry in this run. The analysis then continues with step 310.

Step 340 contains the verification, if the input data column can be found at least once in the bulk candidate list column denoted 'bulk target'. If the input data column is not found, the analysis returns to step 310. Otherwise, it continues with step 350. It should be noted that multiple suitable rows with the same 'bulk target' value may be found. Only the first such row will be used for further processing.

According to step 350, it is verified if the identified row is already marked as 'processed'. If the row is already marked as "processed", the analysis continues with step 360 where a copy of the row is created for use in step 370, in the other case with step 370 with the current un-processed row.

In step 360, a copy of the row of the input data column is created for use in step 370. The "Intermediate" value is added accordingly in step 370, where the complete output data column name is put in the "Intermediate" row of the data column. The 'mark' is set to 'processed'.

Step 380 relates to the final processing of the whole candidate list at the end of the analysis of a single stage. In step 380, all non-empty values in the "Intermediate" column, except for those containing the "STOP" codeword, are moved to the "Bulk Target" column, overwriting the previous values. All marks are removed.

After a complete bulk detection scan has been performed for each source stage as a starting point and for each transit node, the columns remaining in the candidate list can be used for bulk bypassing. The "bulk source" and "bulk target" data represent the start and endpoints of bulk bypassing (the outmost nodes). The following table shows an example of the detection results.

| Mark | Bulk Source | Bulk Target | Intermediate |
|---|---|---|---|
|  | Stage1.Link1.Column1 | Stage4.Link3.Column1 | STOP |
|  | Stage1.Link1.Column2 | Stage5.Link4.Column1 |  |
|  | Stage2.Link2.Column1 | Stage5.Link4.Column2 |  |

Figure 6:
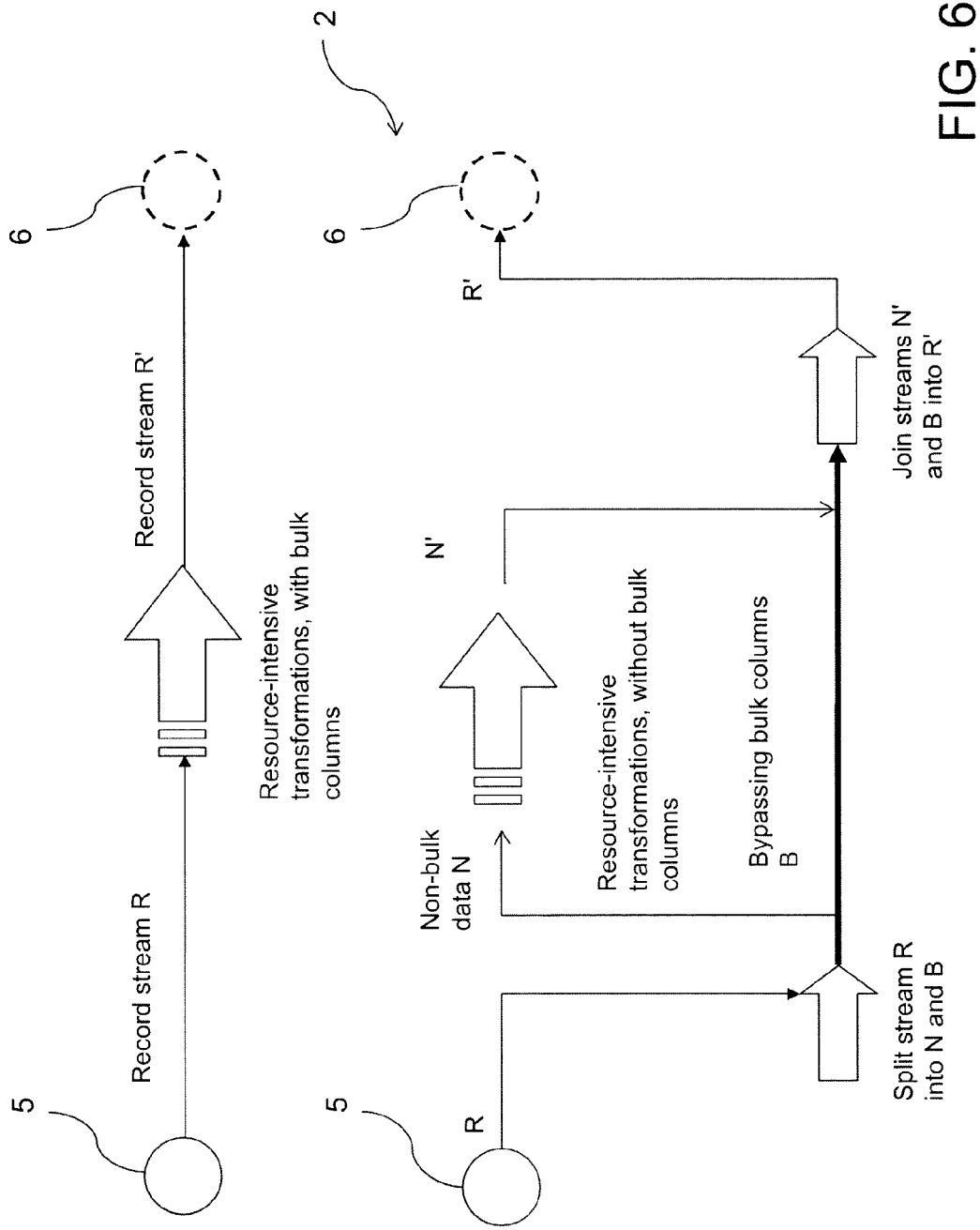
FIG. 6 shows data handling when bypassing a stage within an ETL process as a schematic diagram.

Now referring to FIG. 6, bypassing a stage 2 is shown in detail. Here, a single stage 2 according to FIG. 1 is bypassed by way of example. Nevertheless, bypassing a part of the graph of the ETL process 1 comprising multiple stages 2, e.g. stage1 and stage2 of FIG. 1, can be implemented in the same way.

The lower part of FIG. 6 shows a record R with multiple data columns. A set of data columns of the record R is being processed in the stage 2, denoted as non-bulk data N, and a set of data columns, denoted as Bypassing bulk columns B, has been identified for bypassing and is not processed in this stage 2. Accordingly, the record R is separated into the two sets of data columns, forming new records, which additionally contain an identification column containing information about the separation of the record R.

The set of data columns N is passed to the transformation of this stage 2 and processed into a transformed record N'. The general structure of the record N is identical to the one of the record R, only that the input data columns, which are bypassed, are removed from this record. Therefore, the record N' can be processed by the stage 2 without modifications to the stage 2. The set of data columns B bypasses the transformation. An output record R' is formed by joining the transformed record N' with the bypassed record B according to the information provided in the identification columns.

Now will be discussed a comparative example of data processing according to US2008/0092112 A1 and the further processing according to the inventive method.

Figure 7:
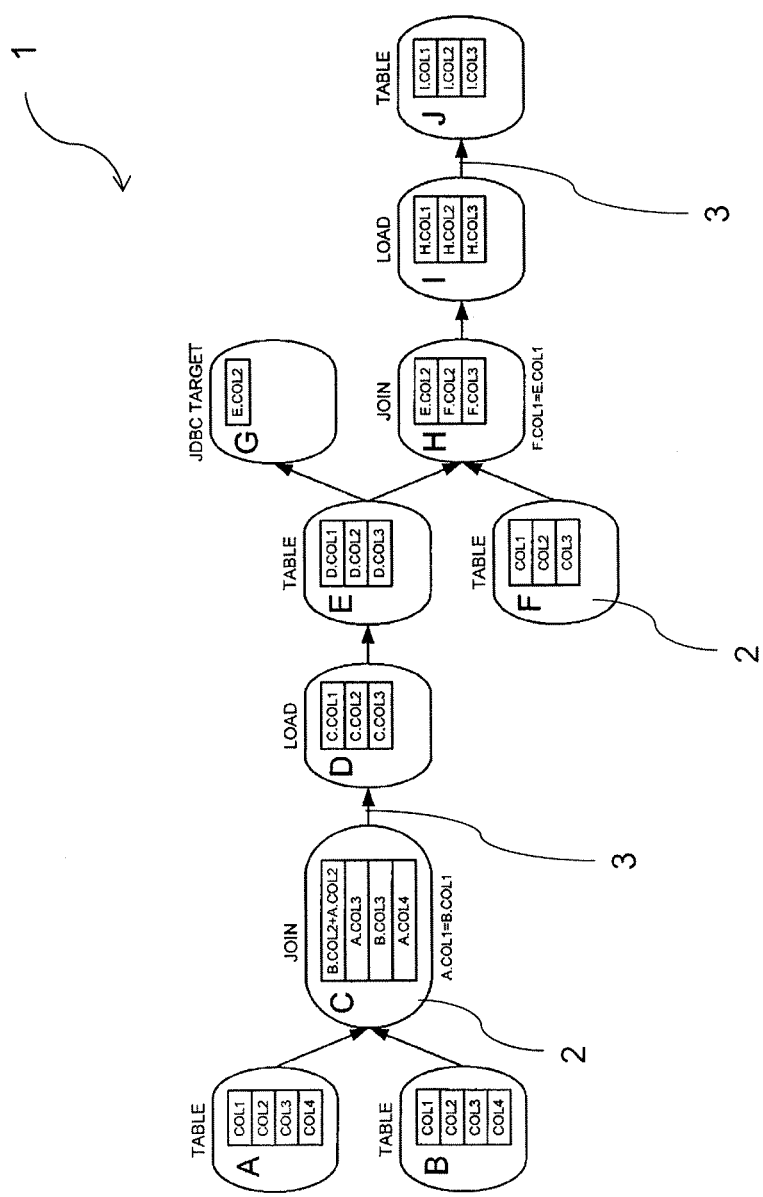
FIG. 7 shows a comparative example of ETL processing data according US2008/0092112 A1 starting with a not optimized ETL process as a schematic diagram.

FIG. 7 shows an ETL processing graph according to an example according to US2008/0092112 as an unoptimized ETL process 1.

Figure 8:
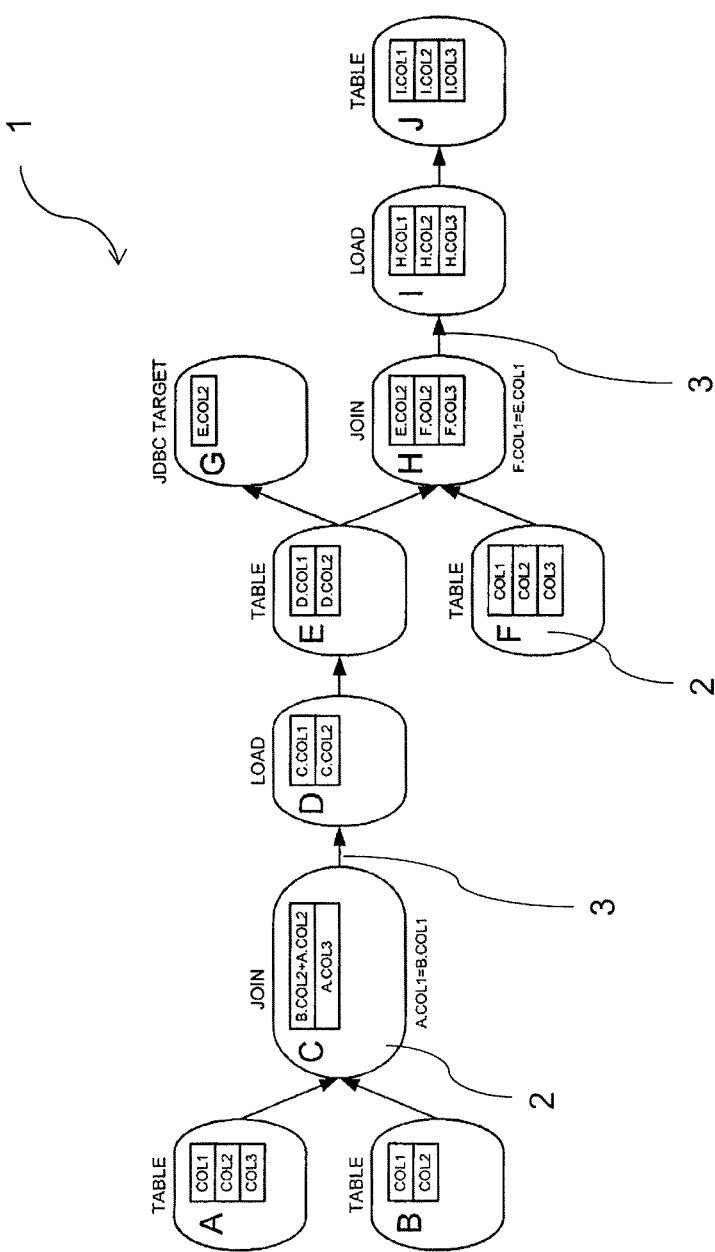
FIG. 8 shows the comparative example of FIG. 7 after applying the processing according to US2008/0092112 A1.

The output of the optimization algorithm proposed in US2008/0092112 is displayed in FIG. 8. Unused columns have been detected and were discarded from the ETL process 1. No data columns have been re-routed or identified for re-routing.

Figure 9:
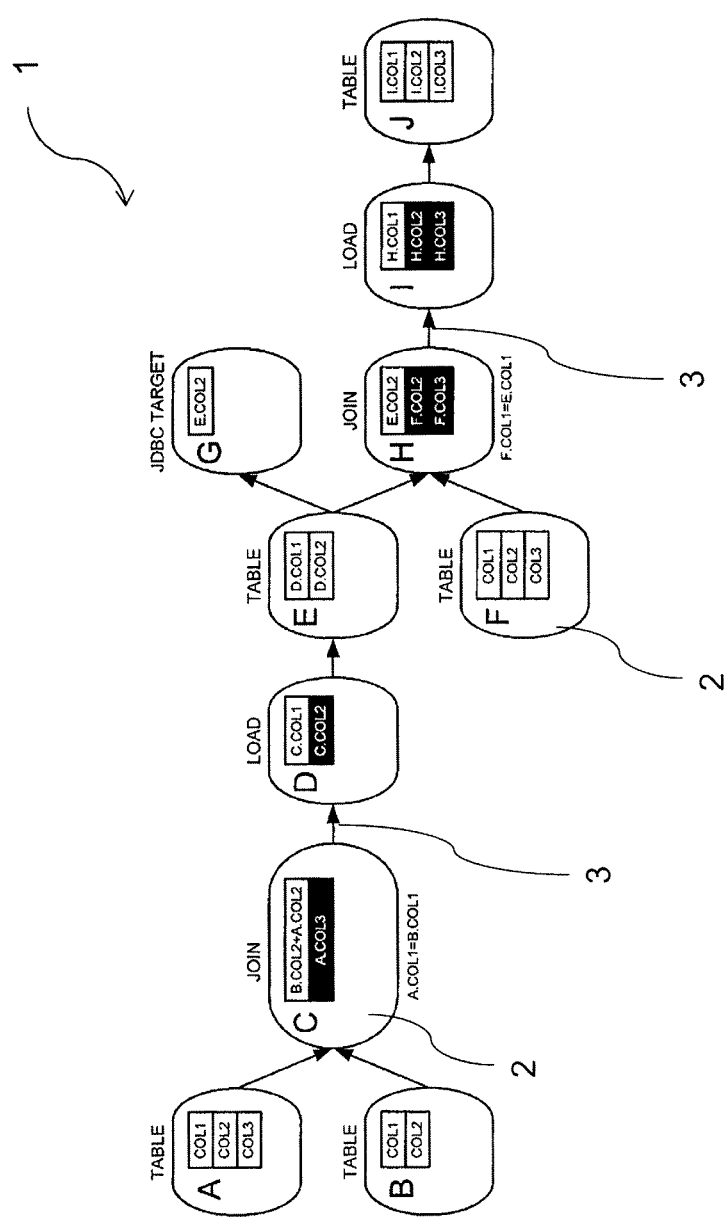
FIG. 9 shows the comparative example of FIG. 8 where additionally the inventive method has been applied.

In the next step, which is shown in FIG. 9, the bulk data detection algorithm is applied to the ETL process 1 shown in FIG. 8. The ETL process 1 shown in FIG. 8 has already been optimized by the algorithm proposed in US2008/0092112.

Figure 10:
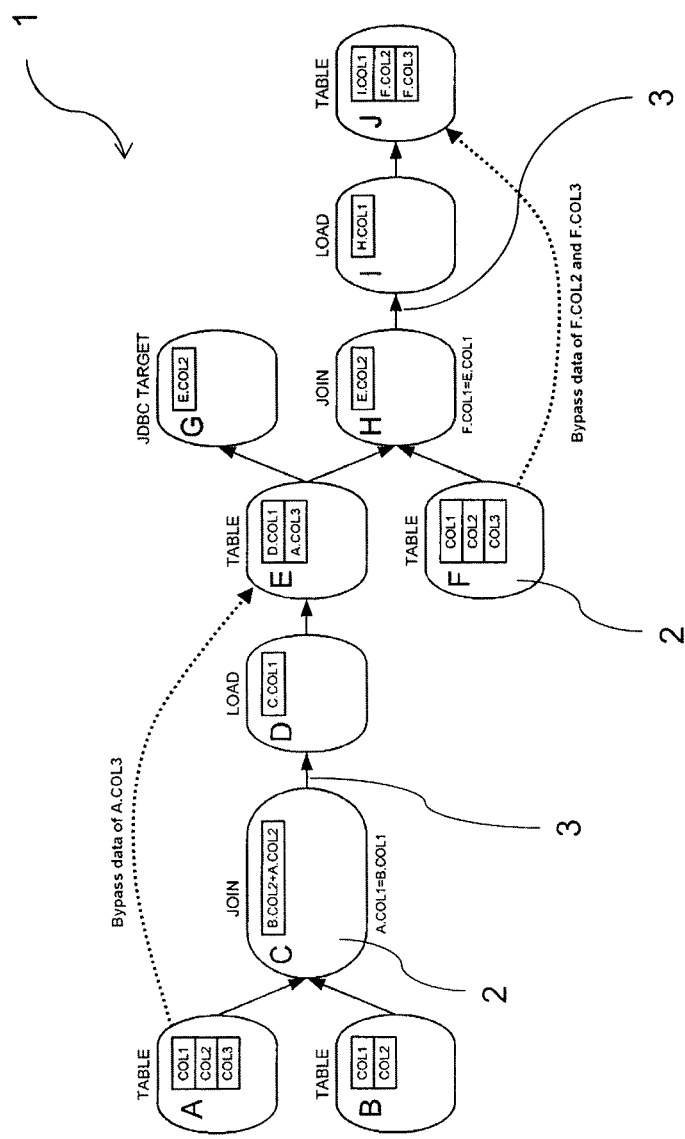
FIG. 10 shows the comparative example of FIG. 9 with bypassing of the bulk data columns being applied.

FIG. 10 shows the re-routed bulk candidate columns in the optimized ETL process 1 according to the method of the present invention. The bulk data detection algorithm proposed in this invention disclosure provides a completely different and more detailed kind of optimization than the algorithm that is proposed in US2008/0092112. The bulk data detection algorithm can be applied to an ETL process 1 that has already been optimized by the algorithm proposed in US2008/0092112 to achieve additional optimization.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

What is claimed is:

1. A computer implemented method for identifying reroutable data columns in an ETL process, comprising:

receiving an ETL process definition describing a set of processing stages and how each processing stage output data column is a result of a function that operates on a set of input data columns;

representing the ETL process definition as a directed graph with nodes representing processing stages and links representing data flow between processing stages;

traversing at least part of the directed graph and identifying a set of subsequent nodes of the directed graph, wherein at least one data column is involved only as input data in identity functions, the at least one data column being reroutable so that the at least one data column is to be passed between outmost nodes of the set of subsequent nodes without modification; and in connection with traversing the at least part of the directed graph, maintaining information about reroutable data columns and the respective outmost nodes.

2. The method of claim 1, further comprising normalizing the processing stages by separating processing stages into respective sets of source stages, target stages and transit stages, wherein source stages read data columns from an external source, target stages send data columns to an external target, and transit stages read and send data columns within the ETL process.

3. The method of claim 1, wherein receiving the En process definition comprises performing an analysis on how the output data column of at least one processing stage is a result of a function that operates on at least one input data column.

4. The method of claim 1, wherein the receiving the ETL process definition comprises receiving meta-information regarding how at least, one processing stage output data column is a result of a function that operates on a subset of input data columns of the at least one processing stage.

5. The method of claim 1, further comprising adding identifiers of all input data columns of a stage into a list with respect to a first of the outmost nodes and removing the identifiers when the respective input data column has been processed in the first of the outmost nodes, and adding an identifier of a second of the outmost nodes to the respective entry in the list.

6. The method of claim 5, wherein traversing at least part of the directed graph and identifying a set of subsequent nodes of the directed graph where at least one data column is involved only as input data in identity functions comprises adding to each identifier an indication of a link associated with where the data column is further transmitted or from where the data column is received.

7. The method of claim 5, wherein adding an identifier of the second of the outmost nodes to the respective entry in the list comprises:

starting with the first of the outmost nodes as the current node;

incrementally updating the second of the outmost nodes with a reference to a subsequent node, when the data column is not processed in the current node; and continuing to at least one subsequent node as the current node, until the data column is being processed in the current node.

8. The method of claim 5, further comprising adding status information indicating a processing status of a data column to the list.

9. A computer implemented method for processing data columns in an ETL process having an ETL process definition describing a set of processing stages and how each processing stage output data column is a result of a function that operates on a subset of input data columns, comprising;

identifying reroutable data columns in the ETL process, wherein the identifying reroutable data columns comprises:

representing the ETL process definition as a directed graph with nodes representing processing stages and links representing data flow between processing stages;

traversing at least part of the directed graph and identifying a set of subsequent nodes of the directed graph wherein at least one data column is involved only as input data in identity functions, the at least one data column being reroutable so that the at least one data column is to be passed between outmost nodes of the set of subsequent nodes without modification; and in connection with traversing the at least part of the directed graph, maintaining information about reroutable data columns and the respective outmost nodes; and rerouting the input data columns identified to be reroutable from the one outmost node to the other outmost node along the directed graph.

10. The method of claim 9, wherein each node has a set of multiple input data columns, and rerouting the input data columns identified to be reroutable from the one outmost node to the other outmost node along the directed graph comprises separating the set of multiple input data columns into a set of processing data columns, which are provided to the respective stage, and a set of bulk data columns, which are involved only as input data in identity functions and bypass the respective stage, each comprising meta-information for joining the set of bulk data columns and a set of processed data columns that is based on the set of processing data columns.

11. The method of claim 10, wherein separating the set of multiple input data columns into a set of processing data columns, which are provided to the respective stage, and a set of hulk data columns, which are involved only as input data in identity functions and bypass the respective stage, comprises providing the set of processing data columns in a structure identical to a structure of the set of multiple input data columns.

12. A computer program product to identify reroutable data columns in an ETL process comprising a computer-readable storage apparatus including computer-readable program code, the computer-readable program code configured to:

receive an ETL process definition describing a set of processing stages and how each processing stage output data column is a result of a function that operates on a set of input data columns;

represent the ETL process definition as a directed graph with nodes representing processing stages and links representing data flow between processing stages;

traverse at least part of the directed graph and identify a set of subsequent nodes of the directed graph, wherein at least one data column is involved only as input data in identity functions, the at least one data column being reroutable so that the at least one data column is to be passed between outmost nodes of the set of subsequent nodes without modification; and in connection with traversing the at least part of the directed graph, maintain information about reroutable data columns and the respective outmost nodes.

13. The computer program product of claim 12, wherein the computer-readable program code is further configured to normalize the processing stages by separating processing stages into respective sets of source stages, target stages and transit stages, wherein source stages read data columns from an external source, target stages send data columns to an external target, and transit stages read and send data columns within the ETL process.

14. The computer program product of claim 12, wherein receiving the ETL process definition comprises performing an analysis on how the output data column of at least one processing stage is a result of a function that operates on at least one input data column.

15. The computer program product of claim 12, wherein receiving the ETL process definition comprises receiving meta-information regarding how at least one processing stage output data column is a result of a function that operates on a subset of input data columns of this at least one processing stage.

16. The computer program product of claim 12, wherein the computer-readable program code is further configured to add identifiers of all input data columns of a stage into a list with respect to a first of the outmost nodes and removing them, when the respective input data column has been processed in the first of the outmost nodes, and add an identifier of a second of the outmost nodes to the respective entry in the list.

17. The computer program product of claim 16, wherein traversing at least part of the directed graph and identifying a set of subsequent nodes of the directed graph where at least one data column is involved only as input data in identity functions comprises adding to each identifier an indication of a link that associates where the data column is further transmitted or from where the data column is received.

18. The computer program product of claim 16, wherein the adding an identifier of the second of the outmost nodes to the respective entry in the list comprises, starting with the first of the outmost nodes as current node, incrementally updating the second of the outmost nodes with a reference to a subsequent node, when the data column is not processed in the current node, and continuing to at least one subsequent node as the current node, until the data column is being processed in the current node.

19. A system for identifying reroutable data columns in an ETL process comprising:
 a processor configured to:
  receive an ETL process definition describing a set of processing stages and how each processing stage output data column is a result of a function that operates on a set of input data columns;
  represent the ETL process definition as a directed graph with nodes representing processing stages and links representing data flow between processing stages;
  traverse at least part of the directed graph and identify a set of subsequent nodes of the directed graph, wherein at least one data column is involved only as input data in identity functions, the at least one data column being reroutable so that the at least one data column is to be passed between outmost nodes of the set of subsequent nodes without modification; and
  in connection with traversing the at least part of the directed graph, maintain information about reroutable data columns and the respective outmost nodes.

20. The system of claim 19, wherein the processor is further configured to normalize the processing stages by separating processing stages into respective sets of source stages, target stages and transit stages, wherein source stages read data columns from an external source, target stages send data columns to an external target, and transit stages read and send data columns within the ETL process.

21. The system of claim 19, wherein receiving the ETL process definition comprises performing an analysis on how the output data column of at least one processing stage is a result of a function that operates on at least one input data column.

22. The system of claim 19, wherein receiving the ETL process definition comprises receiving meta-information regarding how at least one processing stage output data column is a result of a function that operates on a subset of input data columns of this at least one processing stage.

23. The system of claim 19, wherein the processor is further configured to add identifiers of all input data columns of a stage into a list with respect to a first of the outmost nodes and removing them, when the respective input data column has been processed in the first of the outmost nodes, and add an identifier of a second of the outmost nodes to the respective entry in the list.

24. The system of claim 23, wherein traversing at least part of the directed graph and identifying a set of subsequent nodes of the directed graph where at least one data column is involved only as input data in identity functions comprises adding to each identifier an indication of a link, where the data column is further transmitted or from where the data column is received.

25. The system of claim 23, wherein the adding an identifier of the second of the outmost nodes to the respective entry in the list comprises, starting with the first of the outmost nodes as current node, incrementally updating the second of the outmost nodes with a reference to a subsequent node, when the data column is not processed in the current node, and continuing to at least one subsequent node as the current node, until the data column is being processed in the current node.

* * * * *